US012125460B1

(12) United States Patent
Hsieh et al.

(10) Patent No.: US 12,125,460 B1
(45) Date of Patent: Oct. 22, 2024

(54) RESOLUTION SWITCHING

(71) Applicant: Hewlett-Packard Development Company, L.P., Spring, TX (US)

(72) Inventors: Hsing-Hung Hsieh, Taipei (TW); Cheng-Chien Chen, Taipei (TW); Kuan-Ting Wu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/352,003

(22) Filed: Jul. 13, 2023

(51) Int. Cl.
*G09G 5/391* (2006.01)

(52) U.S. Cl.
CPC ....... *G09G 5/391* (2013.01); *G09G 2330/021* (2013.01); *G09G 2340/0435* (2013.01)

(58) Field of Classification Search
CPC ............. G09G 5/391; G09G 2330/021; G09G 2340/0435
See application file for complete search history.

(56) References Cited

U.S. PATENT DOCUMENTS 5,481,651 A * 1/1996 Herold ................ G09G 3/3625 345/94
5,991,883 A 11/1999 Atkinson
6,389,180 B1 * 5/2002 Wakisawa ................ G09G 5/26 345/670
9,355,434 B2 * 5/2016 Dupret .................. G06T 3/4007
9,489,928 B2 11/2016 Andrysco et al.
10,264,211 B2 4/2019 Leech et al.
2001/0020950 A1 * 9/2001 Shimizu .................. G06T 3/403 345/611
2022/0148134 A1 5/2022 Cantu et al.

FOREIGN PATENT DOCUMENTS

EP 1163657 A1 12/2001
WO 00/21066 A1 4/2000

OTHER PUBLICATIONS

Dictionary.com, "adjacent," in Dictionary.com Unabridged. Source location: Random House, Inc. http://dictionary.reference.com/browse/adjacent, Nov. 18, 2011, p. 1.*

* cited by examiner

*Primary Examiner* — Jeff Piziali
(74) *Attorney, Agent, or Firm* — Knobbe, Martens, Olson & Bear, LLP

(57) ABSTRACT

A system that can intelligently help a user judge the resolution requirement of the image content. In an example, the display panel can show in different virtual resolutions or the system can automatically judge whether the image content requires high or low resolution using a similarity judgement. The system can then inform the display panel what virtual resolution should be shown or what the optimal resolution is using the similarity judgment and send the image content to the display panel with that resolution.

11 Claims, 5 Drawing Sheets

RESOLUTION SWITCHING

BACKGROUND

In a computer device, the power consumption of a display is important, as it impacts the length of time that the device may operate on power from the battery. When a display is using a higher resolution, more power is used. For example, an Ultra High Definition (UHD) display typically has a higher power usage than a Full High Definition (FHD) display.

DETAILED DESCRIPTION

Figure 1B:
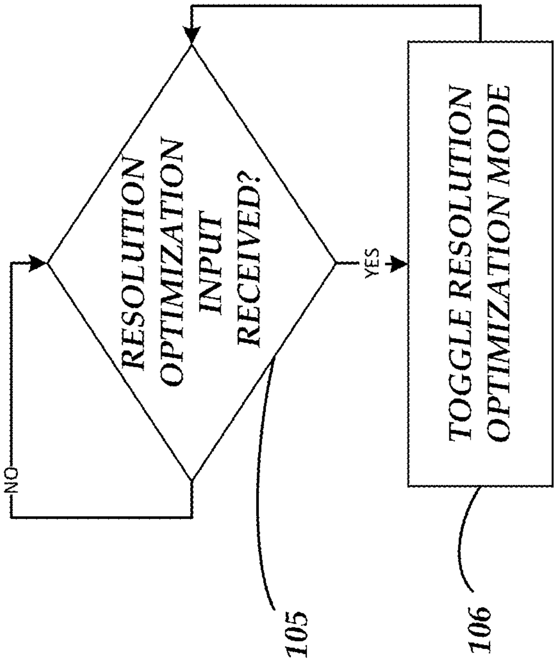
FIG. 1B is a flowchart illustrating one example of a process of toggling a resolution optimization mode of a computing device.

A user may only sometimes want or need a higher resolution display, e.g., to display details of a high-resolution image that may only be perceivable at a higher resolution (e.g., UHD), but the display may be set to UHD so all content, even lower resolution content (e.g., FHD), is displayed at UHD. Therefore, the user is always using the UHD level of power even if it is not always necessary. The resolution of some displays may be adjusted by manual input of a user, such as by adjusting display settings of an operating system.

Described therein are systems, methods, and/or software solutions for automatically adjusting a display's resolution (e.g., between UHD and FHD) based on a similarity analysis of neighboring pixels. A computing system, such as a desktop, laptop, tablet, or other computing device, may execute software or firmware that monitors content that is buffered for display (and/or already displayed) on a display panel and automatically adjusts the display resolution lower and higher depending on similarity of neighboring pixels in the content. The computing system (or simply the "system") may execute a resolution optimization module (or "resolution module") that includes an algorithm that performs a "similarity judgment" to determine which resolution it should run. To determine the "similarity" of a display image, the algorithm may start from a corner pixel and compare that pixel (the "target pixel") with one or more neighboring pixels (or "adjacent pixels"). In one embodiment, if the pixel values are the same, the algorithm notes "1." If the pixels values are different, the algorithm notes "0." In other embodiments, other comparison values may be used, such as a pixel value difference between a target pixel value and an adjacent pixel value. For example, if a target pixel value is 1 and an adjacent pixel value is 0.9, a comparison value may be 0.1 (1-0.9).

In some examples, the algorithm notes a similarity value as a ratio of the comparison values of the neighboring pixels over the number of comparisons done. For example, if pixel 1 compares itself to two neighboring pixels, one with the same pixel value ("1") and one with a different pixel value ("0"), the total comparison value is 1 (1+0) and the number of comparisons is 2, so the similarity value for pixel 1 is 50% (1/2=0.5). Alternatively, pixel 1 may also compare itself to three neighboring pixels. After all the pixels have been compared, the algorithm then calculates an average ratio of similarity of each similarity value. In other embodiments, a similarity value (or similarity score) may be calculated in other manners.

In some examples, the resolution optimization module keeps track of the similarity values and may repeat the process for some or all of the pixel in the display. After the resolution optimization module completes the similarity values, it may determine an overall similarity value for the display (e.g., for all the pixels for which a similarity value was calculated). In some embodiments, the overall similarity value is an average of all of the similarity values. In other embodiments, the overall similarity value may be some other statistical aggregation of the similarity values for multiple pixels. One example, if the overall similarity value is less than a specified threshold, the resolution of the display is maintained at the current level (e.g., at UHD), but if the overall similarity value is above the specified threshold, then the resolution may be lowered (e.g., from UHD to FHD). Then, the system may communicate the resulting resolution (e.g., UHD or FHD) to the display panel. For example, the threshold may be set to 50%. The overall similarity value may then be recalculated, such as at every screen refresh (e.g., a refresh rate), time period, power state change, or in response to some other trigger, and the resolution may be increased (e.g., back to UHD from FHD) when a lower overall similarity value (e.g., below 50%) is calculated. In other embodiments, the display resolution may be returned to a higher resolution when the user provides an input, such as a shortcut key indicating that the display resolution should be increased.

In some implementations, the user selects an "Auto resolution mode" (or "Resolution Optimization Model") for power saving, which will trigger the system to turn on the resolution optimization mode and automatically adjust the resolution using the similarity judgment algorithm. By selecting "Auto resolution mode," the system will routinely run the similarity judgment algorithm to determine the optimal resolution for the current display without the users prompting.

In some implementations, the similarity algorithm compares groups of pixels, instead of each neighboring pixel, to reduce the number of calculations needed. Optionally, the algorithm may stop comparing the pixels partway through the display if the algorithm can already determine the resolution needed without completing all the pixels.

In some implementations, the display can allow the system to duplicate pixel information to nearby pixels regardless of the set display resolution. For example, if the display is set to use UHD resolution, it can virtually show FHD resolution by duplicating the pixel information to nearby pixels. By showing virtually FHD resolution, the system can save power consumption by just generating FHD content.

In some implementations, to begin analyzing the similarity of an input image, the algorithm starts from the corner pixel. This may be any corner pixel of the display. From there, the algorithm may compare the corner pixel to neighboring pixels. Then, the algorithm continues to the rest of the pixels in the display, until it has completed the similarity analysis for every pixel (or some preset of the pixels.

Example Resolution Optimization

Figure 1A:
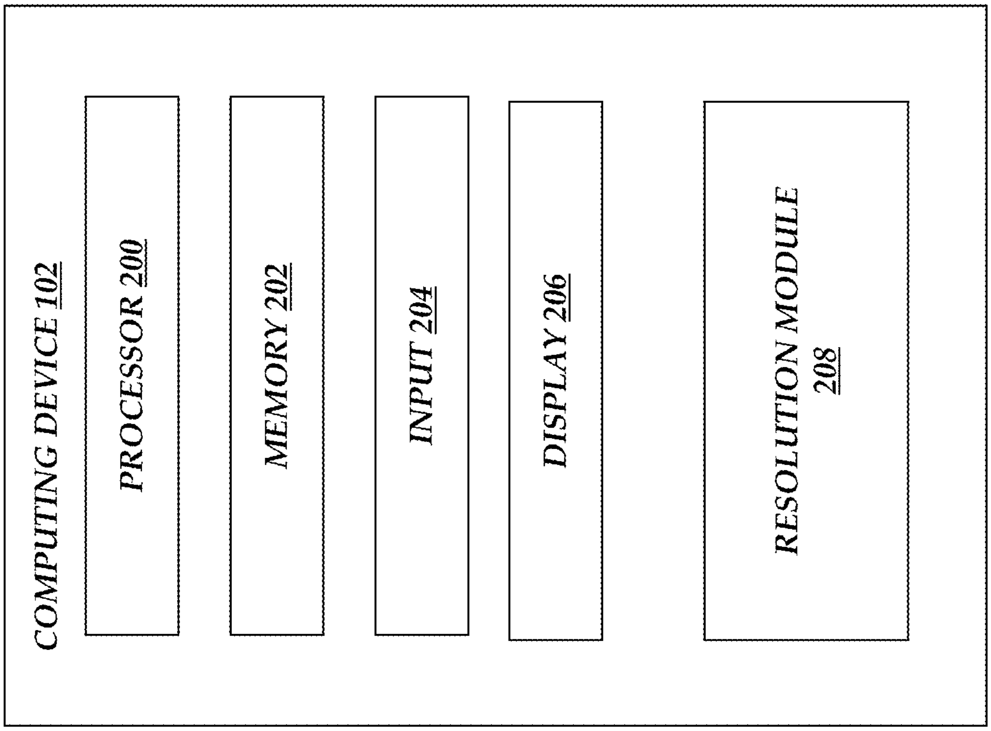
FIG. 1A is a block diagram illustrating one example of a computing device that uses a resolution module to optimize resolution of a display.

FIG. 1A is a block diagram illustrating one example of a computing device 102 that uses a resolution module 208 to optimize resolution of a display. In this example, the computing device 102 includes a processor 200, memory 202, input/output 204, display 206, and a resolution module 208. The resolution module 208 performs the similarity comparison and adjusts the resolution of the display. In some examples, a resolution optimization mode may be toggled via user input from input/output 204, such as via a keyboard, mouse, eye tracking, touchscreen, gesture, etc. command from the user.

FIG. 1B is a flowchart illustrating one example of a process of toggling a resolution optimization mode of a computing device. In this example, at block 105 the resolution module receives input from a user on whether the user wants to utilize resolution optimization. If yes (e.g., a keyboard hotkey is received), the system toggles resolution optimization mode at block 106. If no, the system returns to awaiting input from the user on whether the user wants to utilize resolution optimization at block 105.

Figure 2:
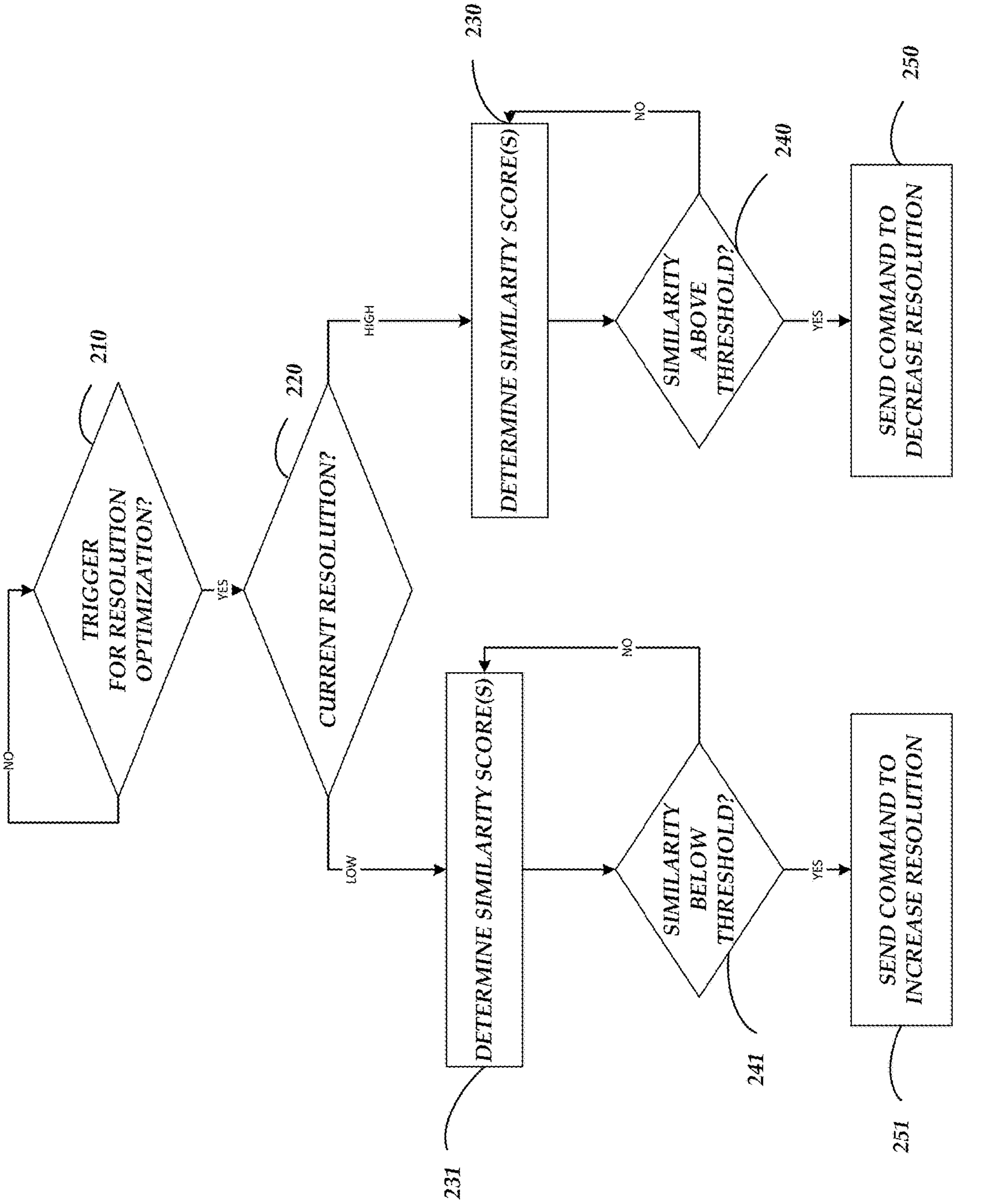
FIG. 2 is a flowchart illustrating an example process of resolution optimization mode.

FIG. 2 is a flowchart illustrating an example process of resolution optimization mode, such as may be performed by the resolution module 108 of FIG. 1A when a resolution optimization mode is turned on (e.g., as shown in FIG. 1B). Once resolution optimization mode is turn on, block 210 is a trigger for the optimization module to calculate (or recalculate) the similarity scores, which may occur 60 times/second or some other set rate, or based on some other trigger, such as a change in power state of the display (e.g., powering on the display, powering on the computing device, exiting sleep mode, or opening lid of the computing device). In some examples, a trigger may be that a file of a certain type is opened, there is a change of a power state or a change to content to be displayed at the display panel, such as a change of focus or activation of an application on the computing device, etc.

At block 220, once the system receives a trigger for the optimization module to recalculate the similarity scores (at block 210), it determines the current resolution of the display 206 (FIG. 1A). For ease of description, certain examples herein are discussed with reference to UHD and FHD resolutions. However, the resolution optimization is also applicable to any other resolutions. In the example of FIG. 2, the current resolution may be UHD (higher resolution) or FHD (lower resolution). The resolution may be determined based on a current setting of the display and/or display driver. In some examples, high versus low resolution may be determined based on a specified threshold resolution or predetermined in the system where high resolution is above the threshold and low resolution is below the threshold. Once the system has the resolution level, it will determine the similarity score at block 230 or 231.

If the current resolution of the display 206 is high, the method continues to block 230 wherein the system determines a similarity score of the pixels of the display, as detailed below in FIG. 3. As discussed in further detail below, the system may compare various sets or groups of pixels in the display 206 to calculate distinct similarity values for target pixels and an overall similarity score.

At block 240, the system determines if the overall similarity score of the pixels of the display 206 as calculated in block 230 is at or above a specified threshold. If the similarity score of the pixels of the display 206 is below the specified threshold, the system will return to the previous block 230 of determining the similarity score to await if the score changes as the display changes. If there is no change or the similarity score remains below the specified threshold, then the resolution remains the same. In some examples, the method returns to block 210 to await a trigger for recalculation of the similarity score.

If the overall similarity score as calculated in block 230 is at or above the specified threshold, the method continues to block 250 where a command to decrease the display resolution is sent to the display. For example, the system may send a command to the display module to reduce the display resolution from UHD to FHD.

Alternatively, if at block 220 the current resolution of the display is determined to be low, the system will determine a similarity score of the pixels of the display at block 231 using the same method as discussed for block 230.

At block 241, the system determines if the overall similarity score of the pixels of the display 206 as calculated in block 231 is at or below a specified threshold. If the similarity score of the pixels of the display 206 is above the specified threshold, the system will return to the previous block 231 of determining the similarity score to await if the score changes as the display changes. If there is no change or the similarity score remains above the specified threshold, then the resolution remains the same. In some examples, the method returns to block 210 to await a trigger for recalculation of the similarity score.

If the overall similarity score as calculated in block 231 is at or below the specified threshold, the system will send a command to increase the display resolution at block 251. For example, the system may send a command to the display module to increase the display resolution from FHD to UHD.

Figure 3:
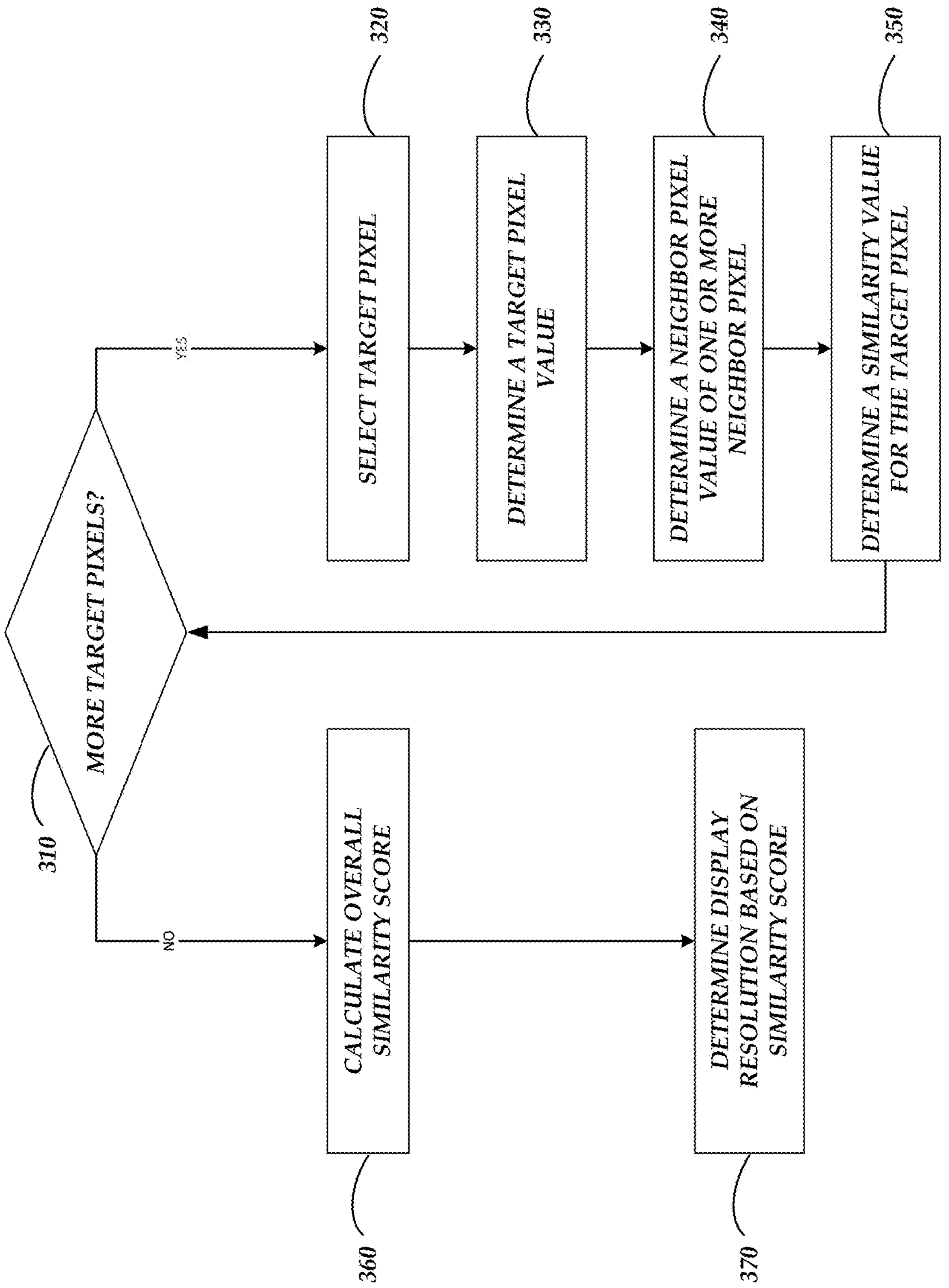
FIG. 3 is a flowchart illustrating one embodiment of an example process of determining a similarity score of pixels in a display.

FIG. 3 is a flowchart illustrating one embodiment of an example process of determining a similarity score of pixels in a display, such as may be performed as part of the similarity score determinations in blocks 230 and 240 of FIG. 2. In this example process, at block 310, the system (e.g., the resolution module) determines whether there are more target pixels to evaluate. As noted above, in some cases a similarity value may be calculated for all pixels, while in other embodiments similarity values are only calculated for certain pixels. For example, in the examples discussed below in FIGS. 5B and 5D, a similarity value is only calculated for each group of four pixels.

If the system determines that additional target pixels are available for scoring, the method continues to block 320 where the system will select a next target pixel. Then, at block 330, a target pixel value of the target pixel is determined and at block 340 a neighbor pixel value of one or more neighbor pixels in one or more directions is determined. For example, the neighbor pixel value of a neighbor pixel to the right and the neighbor pixel below the target pixel may be determined. In other examples, fewer (e.g., one) or more (e.g., three or more) neighbor pixel values may be determined for use in calculating a similarity score for a particular target pixel.

Continue to block 350, the system determines a similarity value based on a distinct group of pixels including at least the target pixel value and the one or more neighbor pixel values. For example, if the neighbor pixel value and the target pixel value are the same, then the similarity value may be 0 and if the neighbor pixel value and the target pixel value are not the same, then the similarity value may be 1. In some examples, such as where multiple neighbor pixel values are used in calculating a similarity score for a target pixel, a comparison value for each pair of pixel values may be determined. The method then returns to block 310 where a determination is made as to whether there are additional target pixels and, if so, blocks 320-350 are repeated for the additional target pixels. Once there are no more target pixels, the system has a set of similarity values as calculated in block 350, with each similarity value being associated with a distinct group of pixels.

At block 360, once there are no more target pixels left for scoring, the system will calculate an overall similarity score. For example, the system may take an average of all the similarity values, of the target pixel. Then, at block 370, based on the overall similarity score, the system will determine the optimal display resolution based whether the overall similarity score is at or above a specified threshold.

Figure 4:
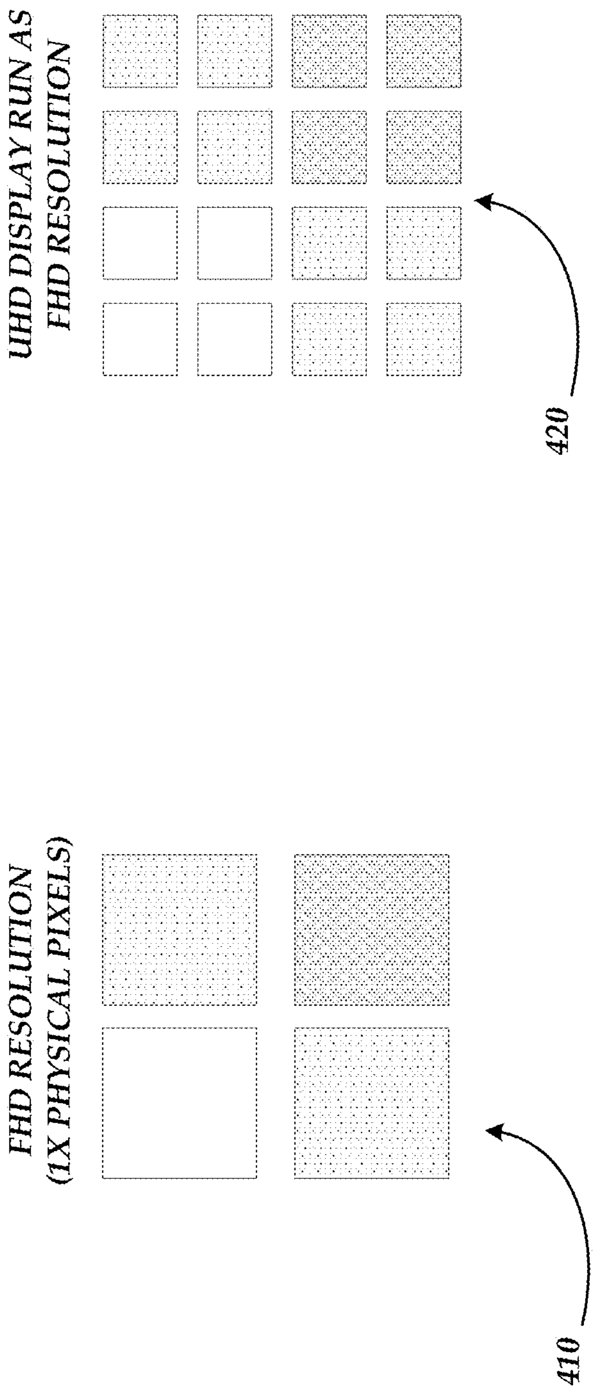
FIG. 4 illustrates three examples of the pixels in a display based on various possible resolutions of the display.

FIG. 4 illustrates two examples of similarly sized areas of a display with different quantities of pixels and different pixel values. In the figures, fill patterns of the example pixels are used to represent different pixel values. In the example of FIG. 4, an FHD display 410 represents four physical pixels of an FHD display and an UHD display 420 represents 16 physical pixels of an UHD display. Thus, the UHD display 420 is capable of illustrating four times the quantity of pixels as the FHD display 410. Thus, if the pixel values of neighboring pixels in the UHD display 420 corresponding to a single physical pixel in the FHD display 410 (e.g., groups of four pixels in the example UHD display 420), the UHD display 420 may operate in a FHD resolution mode with minimal (or any) loss of detail in the displayed content. In this example of FHD resolution mode, a single pixel value may be sent to the display driver for each group of four pixels, potentially saving processing power and energy.

FIGS. 5A-5D illustrates various examples of display pixels and methods of calculating similarity values. In these examples, a 4×4 array of pixels is shown, which may represent 16 pixels in the upper left corner of a display, such as 16 pixels of the 28,294,400 pixels of a UHD display. In other embodiments, the pixel groups of FIGS. 5A-5D represent other portions of a display, such as an upper right corner, central portion, lower left corner, lower right corner, etc. The example similarity scoring discussed with reference to the 16 pixels of FIGS. 5A-5D may be similarly applied to other pixels of a display panel, such as to some predetermined subset of the pixels, until a threshold similarity is met, or until all pixels have been scored.

Figure 5A:
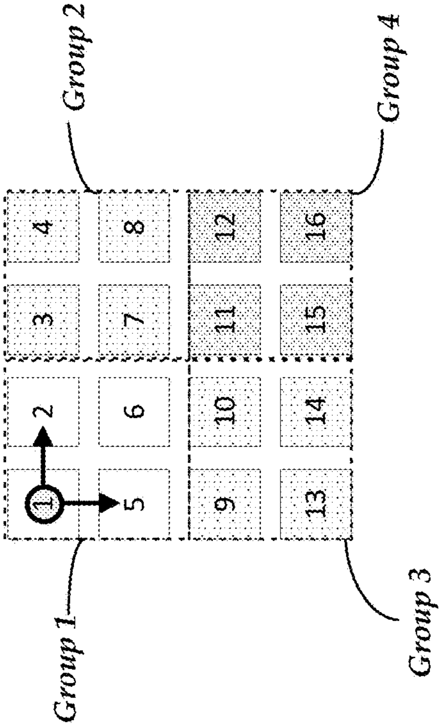
FIGS. 5A-5D illustrates various examples of display pixels and example methods of calculating similarity values.
Figure 5B:
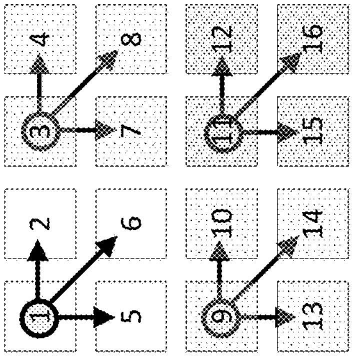

FIGS. 5A and 5B each illustrate the same pixel values (where pixel values are represented by fill patterns) for the illustrated subset of 16 pixels. As illustrated, the values of each neighboring group of four pixels are the same (e.g., the group 1 pixel values are all 1, the group 2 pixel values are all 0.5, etc.). Thus, the current pixel values of FIGS. 5A and 5B may be indicative of an opportunity to lower the display resolution, such as by displaying the four pixels of each group each as a single pixel (e.g., only a single pixel value of 1 may be sent to the display for a lower resolution, larger, pixel with an area that corresponds with group 1). As discussed further below, similarity values of the example pixels in FIGS. 5A and 5B are calculated in different manners, which may each have their own technical advantages.

Starting with FIG. 5A, each target pixel is compared to two neighbor pixels, e.g., a pixel to the right (e.g., a first direction from the target pixel) and a pixel below (e.g., a second direction from the target pixel) in this example. Thus, for target pixel 1, a similarity of pixel 1 with each of pixels 2 (to the right of pixel 1) and 5 (below pixel 1) is considered. Results of these two comparisons may then be used to calculate a pixel similarity value for the target pixel, and then the pixel similarity values (e.g., 16 different similarity values for the 16 pixels in FIG. 5A) may be aggregated in some way to determine an overall similarity value, which may be used to determine if the resolution of the display should be adjusted. Using the example pixel values of FIG. 5A, comparison values for individual target pixels may be calculated as shown below, where a "Y" indicates a same pixel value for the pair of pixels and "N" indicates a different pixel values for the pair of pixels, and the percent match indicates a similarity value for the pixel calculated as a percentage of the maximum of two possible comparisons that were a match. In this example, an overall similarity score for this 16-pixel portion of a display is 63% (e.g., an average of the similarity values of the 16 pixels). Thus, if the similarity threshold for adjusting resolution to a lower resolution is less than 63% (e.g., 50%) the resolution module may initiate adjustment of the display resolution to a lower resolution (e.g., switching from UHD to FHD), such as by sending a command to the display driver.

| Target Pixel | Right Pixel match? | Below Pixel match? | Percent matches? |
|---|---|---|---|
| 1 | Y | Y | 100 |
| 2 | N | Y | 50 |
| 3 | Y | Y | 100 |
| 4 | Y | | 100 |
| 5 | Y | N | 50 |
| 6 | N | N | 0 |
| 7 | Y | N | 50 |
| 8 | | N | 0 |
| 9 | Y | Y | 100 |
| 10 | N | Y | 50 |
| 11 | Y | Y | 100 |
| 12 | | Y | 100 |
| 13 | Y | | 100 |
| 14 | N | | 0 |
| 15 | Y | | 100 |
| 16 | | | NA |

Similarity Scores for FIG. 5A

For FIG. 5B, each target pixel is compared to three neighbor pixels, e.g., a pixel to the right, the pixel below and the diagonal pixel in this example. Thus, for target pixel 1, a similarity of pixel 1 with each of pixels 2 (to the right of pixel 1), 6 (diagonal to pixel 1), and 5 (below pixel 1) is considered. Results of these three comparisons may then be used to calculate a pixel similarity value for the target pixel, and then the pixel similarity values may be aggregated in some way to determine an overall similarity value, which may be used to determine if the resolution of the display should be adjusted. Using the example pixel values of FIG. 5B, comparison values for individual target pixels may be calculated as shown below, where a "Y" indicates a same pixel value for the pair of pixels and "N" indicates a different pixel values for the pair of pixels, and the percent match indicates a similarity value for the pixel calculated as a percentage of the maximum of three possible comparisons that were a match. In this example, an overall similarity score for this 16-pixel portion of a display is 100%, based on the similarity values calculated for 4 of the pixels (with the other 12 pixels considered as neighbor pixels in a similarity value calculation). Thus, if the similarity threshold for adjusting resolution to a lower resolution is less than 100% (e.g., 50%) the resolution module may initiate adjustment of the display resolution to a lower resolution (e.g., switching from UHD to FHD), such as by sending a command to the display driver.

| Target Pixel | Right Pixel match? | Diagonal Pixel match? | Below Pixel match? | Percent matches? |
|---|---|---|---|---|
| 1 | Y | Y | Y | 100 |
| 3 | Y | Y | Y | 100 |
| 9 | Y | Y | Y | 100 |
| 11 | Y | Y | Y | 100 |

Similarity Scores for FIG. 5B

Figure 5C:
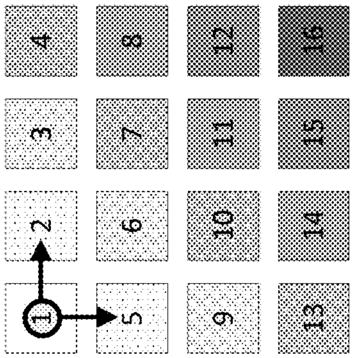

Similar to FIG. 5A, in FIG. 5C each target pixel is compared to two neighbor pixels, e.g., a pixel to the right and a pixel below in this example. Thus, for target pixel 1, a similarity of pixel 1 with each of pixels 2 (to the right of pixel 1) and 5 (below pixel 1) is considered. Results of these two comparisons may then be used to calculate a pixel similarity value for the target pixel, and then the pixel similarity values (e.g., 16 different similarity values for the 16 pixels in FIG. 5A) may be aggregated in some way to determine an overall similarity value, which may be used to determine if the resolution of the display should be adjusted. Using the example pixel values of FIG. 5C, comparison values for individual target pixels may be calculated as shown below, where a "Y" indicates a same pixel value for the pair of pixels and "N" indicates a different pixel values for the pair of pixels, and the percent match indicates a similarity value for the pixel calculated as a percentage of the maximum of two possible comparisons that were a match. In this example, an average similarity score for this 16-pixel portion of a display is 0%. In some examples, if the display is already using a higher resolution (e.g., UHD) and the overall similarity value remains below a similarity threshold for adjusting the resolution to a lower resolution (e.g., 50%), the resolution module maintains the display at the higher resolution. In some examples, if the display is in a lower resolution mode (e.g., a UHD is currently displaying content at an FHD resolution) when the overall resolution value exceeds a threshold (e.g., 50%) the resolution module may initiate adjustment of the display resolution to a higher resolution (e.g., switching from FHD to UHD), such as by sending a command to the display driver.

| Target Pixel | Right Pixel match? | Below Pixel match? | Percent matches? |
|---|---|---|---|
| 1 | N | N | 0 |
| 2 | N | N | 0 |
| 3 | N | N | 0 |
| 4 | N | | 0 |
| 5 | N | N | 0 |
| 6 | N | N | 0 |
| 7 | N | N | 0 |
| 8 | | N | 0 |
| 9 | N | N | 0 |
| 10 | N | N | 0 |
| 11 | N | N | 0 |
| 12 | N | | 0 |
| 13 | N | | 0 |
| 14 | N | | 0 |
| 15 | N | | 0 |
| 16 | | | NA |

Similarity Scoring for FIG. 5C

Figure 5D:
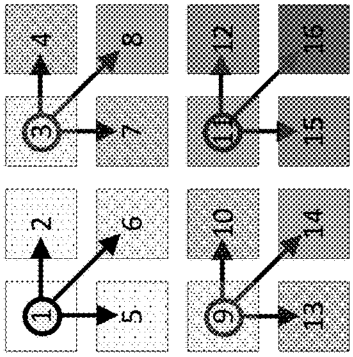

For FIG. 5D, similar to FIG. 5B, each target pixel is compared to three neighbor pixels, e.g., a pixel to the right, a pixel below and a diagonal pixel in this example. Thus, for target pixel 1, a similarity of pixel 1 with each of pixels 2 (to the right of pixel 1), 6 (diagonal to pixel 1), and 5 (below pixel 1) is considered. Results of these three comparisons may then be used to calculate a pixel similarity value for the target pixel, and then the pixel similarity values may be aggregated in some way to determine an overall similarity value, which may be used to determine if the resolution of the display should be adjusted. Using the example pixel values of FIG. 5D, comparison values for individual target pixels may be calculated as shown below, where a "Y" indicates a same pixel value for the pair of pixels and "N" indicates a different pixel values for the pair of pixels, and the percent match indicates a similarity value for the pixel calculated as a percentage of the maximum of three possible comparisons were a match. In this example, an average similarity score for 4 of the pixels (with the other 12 pixels considered as neighbor pixels in a similarity value calculation) of a display is 0%. In some examples, if the display is already using a higher resolution (e.g., UHD) and the overall similarity score remains below a similarity threshold for adjusting the resolution to a lower resolution (e.g., 50%), the resolution module maintains the display at the higher resolution. In some examples, if the display is in a lower resolution mode (e.g., a UHD is currently displaying content at an FHD resolution), when the overall resolution value exceeds a threshold (e.g., 50%) the resolution module may initiate adjustment of the display resolution to a higher resolution (e.g., switching from FHD to UHD), such as by sending a command to the display driver.

| Target Pixel | Right Pixel match? | Diagonal Pixel match? | Below Pixel match? | Percent matches? |
|---|---|---|---|---|
| 1 | N | N | N | 0 |
| 3 | N | N | N | 0 |
| 9 | N | N | N | 0 |
| 11 | N | N | N | 0 |

Similarity Scoring for FIG. 5D

Example Implementation Details

It is to be understood that not necessarily all objects or advantages may be achieved in accordance with any particular example described herein. Thus, for example, those skilled in the art will recognize that certain examples may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are stored in memory (e.g., RAM) and are executed by a hardware computer processor of a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the example, certain acts, events, or functions of any of the algorithms described herein can be performed in a different sequence, can be added, merged, or left out altogether (e.g., not all described acts or events are necessary for the practice of the algorithms). Moreover, in certain examples, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, components and modules described in connection with the examples disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another example, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, “can,” “could,” “might,” or “may,” unless specifically stated otherwise, are otherwise understood within the context as used in general to convey that certain examples include, while other examples do not include, certain features, elements, blocks and/or steps. Thus, such conditional language is not generally intended to imply that features, elements and/or steps are in any way required for one or more examples or that one or more examples necessarily include logic for deciding, with or without user input or prompting, whether these features, elements, blocks and/or steps are included or are to be performed in any particular example.

Disjunctive language such as the phrase “at least one of X, Y, or Z,” unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the examples described herein in which elements or functions may be deleted, executed out of order from that shown, or discussed, including substantially, concurrently or in reverse order, depending on the functionality involved as would be understood by those skilled in the art.

Unless otherwise explicitly stated, articles such as “a” or “an” should generally be interpreted to include one or more described items. Accordingly, phrases such as “a device configured to” are intended to include one or more recited devices. Such one or more recited devices can also be collectively configured to carry out the stated recitations. For example, “a processor configured to carry out recitations A, B, and C” can include a first processor configured to carry out recitation A working in conjunction with a second processor configured to carry out recitations B and C.

What is claimed is:

1. A non-transitory computer readable medium having instructions stored thereon, the instructions when executed cause a processor of a computing device to:

calculate a set of similarity values, wherein each similarity value is associated with a distinct group of pixels of a display panel;

calculate an overall similarity value based on the set of similarity values;

based on the overall similarity value, determine an optimal display resolution of content to be displayed on the display panel, wherein calculating the set of similarity values includes:

for distinct similarity values:

determine a target pixel value of a target pixel;

determine a neighbor pixel value of a neighbor pixel of the target pixel; and determine a distinct similarity value based on the target pixel value and the neighbor pixel value; and update a current resolution of the display panel to the determined optimal display resolution.

2. The non-transitory computer readable medium of claim 1, wherein the instructions when executed, further cause the computing device to:

for the distinct similarity values:

determine a plurality of neighbor pixel values of a corresponding plurality of neighbor pixels of the target pixel;

wherein the distinct similarity value is based on a comparison of the target pixel value with the plurality of neighbor pixel values.

3. The non-transitory computer readable medium of claim 1, wherein the distinct similarity values are based on differences between the target pixel value and the plurality of neighbor pixel values.

4. The non-transitory computer readable medium of claim 1, wherein an overall similarity value of less than a threshold is associated with a first display resolution and an overall similarity value of more than the threshold is associated with a second display resolution that is lower than the first display resolution.

5. The non-transitory computer readable medium of claim 4, wherein the first display resolution is Ultra High Definition and the second display resolution is Full High Definition, wherein Ultra High Definition comprises 28,294,400 pixels and Full High Definition comprises less than 28,294,400 pixels.

6. The non-transitory computer readable medium of claim 1, wherein the distinct similarity value is one if the target pixel value and the neighbor pixel value are equal and the distinct similarity value is zero if the target pixel value and the neighbor pixel value are not equal.

7. The non-transitory computer readable medium of claim 6, wherein the overall similarity value is a percentage of the target pixels having distinct similarity values of one.

8. The non-transitory computer readable medium of claim 4, wherein the threshold is fifty percent.

9. The non-transitory computer readable medium of claim 1, wherein the plurality of neighbor pixels comprise a first neighbor pixel next to the target pixel in a first direction and a second neighbor pixel next to the target pixel in a second direction.

10. The non-transitory computer readable medium of claim 9, wherein the plurality of neighbor pixels comprise a third neighbor pixel adjacent the target pixel in a third direction.

11. The non-transitory computer readable medium of claim 10, wherein the first neighbor pixel is right of the target pixel, the second neighbor pixel is below the target pixel, and the third neighbor pixel is left of the target pixel.

* * * * *